United States Patent
Peng et al.

(10) Patent No.: US 11,979,857 B2
(45) Date of Patent: May 7, 2024

(54) RESOURCE SELECTION METHOD AND TERMINAL

(71) Applicant: VIVO MOBILE COMMUNICATION CO., LTD., Dongguan (CN)

(72) Inventors: Shuyan Peng, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 515 days.

(21) Appl. No.: 17/211,809

(22) Filed: Mar. 24, 2021

(65) Prior Publication Data

US 2021/0212026 A1    Jul. 8, 2021

Related U.S. Application Data

(63) Continuation of application No. PCT/CN2019/104901, filed on Sep. 9, 2019.

(30) Foreign Application Priority Data

Sep. 28, 2018  (CN) .......................... 201811141569.4

(51) Int. Cl.
*H04W 72/02*  (2009.01)
*H04W 28/02*  (2009.01)
(Continued)

(52) U.S. Cl.
CPC ....... *H04W 72/02* (2013.01); *H04W 28/0268* (2013.01); *H04W 28/26* (2013.01);
(Continued)

(58) Field of Classification Search
CPC . H04W 72/02; H04W 28/0268; H04W 28/26; H04W 72/0446; H04W 72/0453; H04W 74/0808
See application file for complete search history.

(56) References Cited

U.S. PATENT DOCUMENTS

2020/0092911 A1 * 3/2020 Li .................... H04W 74/006
2020/0296690 A1 * 9/2020 Lee .................... H04W 4/40

FOREIGN PATENT DOCUMENTS

CN    106686728 A    5/2017
CN    107682930 A    2/2018
(Continued)

OTHER PUBLICATIONS

International Search Report issued in corresponding International application No. PCT/CN2019/104901, dated Sep. 9, 2019, 4 pages.
(Continued)

*Primary Examiner* — Duc C Ho
(74) *Attorney, Agent, or Firm* — IPX PLLC

(57) ABSTRACT

The embodiments of the present disclosure provide a resource selection method and a terminal. The resource selection method includes determining a target transmission resource of a to-be-transmitted data packet, where the target transmission resource is selected from one of the following: a periodically reserved transmission resource obtained according to a sensing result of a first sensing window; a transmission resource obtained according to a sensing result of a second sensing window, where a start time of the second sensing window is or later than an arrival time of the data packet; and a randomly selected transmission resource.

20 Claims, 3 Drawing Sheets

---

Determine a target transmission resource of a to-be-transmitted data packet, wherein the target transmission resource is selected from one of the following:
1) a periodically reserved transmission resource obtained according to a detection result of a first detection window;
2) a transmission resource obtained according to a detection result of a second detection window, where a start time of the second detection window is or later than an arrival time of the data packet; and
3) a randomly selected transmission resource.

— 11

(51) Int. Cl.
   *H04W 28/26*       (2009.01)
   *H04W 72/0446*     (2023.01)
   *H04W 72/0453*     (2023.01)
   *H04W 74/0808*     (2024.01)

(52) U.S. Cl.
   CPC ... *H04W 72/0446* (2013.01); *H04W 72/0453* (2013.01); *H04W 74/0808* (2013.01)

(56) References Cited

FOREIGN PATENT DOCUMENTS

| WO | 2018027816 A1 | 2/2018 |
| WO | 2018058558 A1 | 4/2018 |
| WO | 2018137243 A1 | 8/2018 |

OTHER PUBLICATIONS

First Office Action issued in related Chinese application No. 201811141569.4, dated Aug. 28, 2020, 9 pages.
OPPO, "Discussion on resource allocation in NR-V2X" 3GPP TSG-RAN WG1 Meeting #94, R1-1808906, Aug. 24, 2018.
Qualcomm, "Sensing based resource selection for V2P", 3GPP TSG-RAN WG1 #87, R1-1611592, Nov. 18, 2016.

* cited by examiner

Determine a target transmission resource of a to-be-transmitted data packet, wherein the target transmission resource is selected from one of the following:
1) a periodically reserved transmission resource obtained according to a detection result of a first detection window;
2) a transmission resource obtained according to a detection result of a second detection window, where a start time of the second detection window is or later than an arrival time of the data packet; and
3) a randomly selected transmission resource.

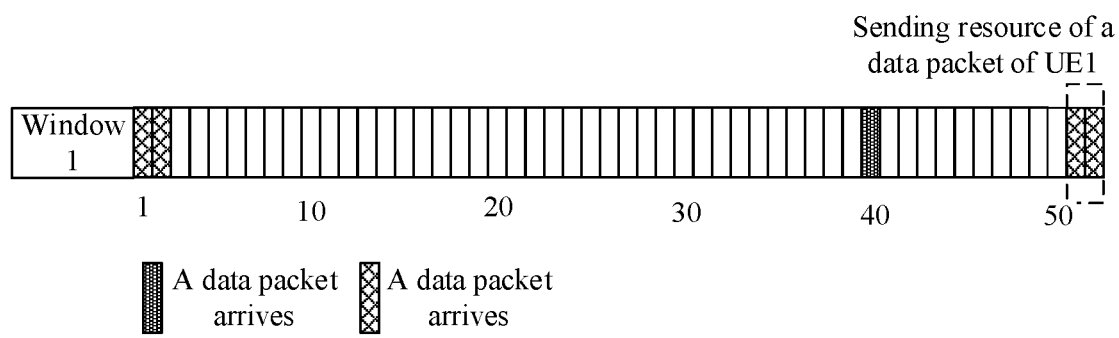

FIG. 2

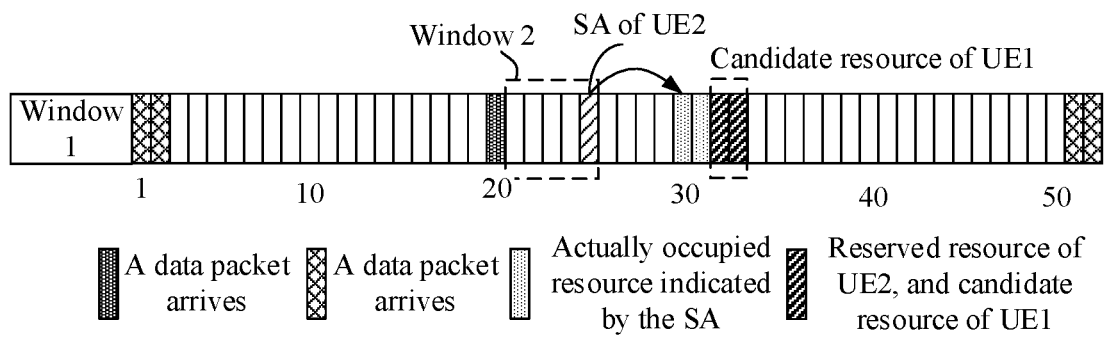

FIG. 3

RESOURCE SELECTION METHOD AND TERMINAL

CROSS-REFERENCE OF RELATED APPLICATIONS

This application is a bypass continuation of PCT Application No. PCT/CN2019/104901, filed Sep. 9, 2019, which claims priority to Chinese Patent Application No. 201811141569.4 filed in China on Sep. 28, 2018. Both applications are incorporated herein by reference in their entireties.

TECHNICAL FIELD

Embodiments of the present disclosure relate to the field of wireless communications technologies, and in particular, to a resource selection method and a terminal.

BACKGROUND

A sidelink refers to a link between a terminal (UE) and UE for direct communication without a network. A Long Term Evolution (LTE) sidelink includes device to device (D2D) and vehicle to everything (V2X) communication. A New Radio (NR) sidelink includes V2X communication. On a sidelink, two resource allocation modes are supported: scheduling resource allocation mode and autonomous resource selection mode of UE. On an LTE sidelink, in the scheduling resource allocation mode, a base station configures a resource for a sidelink. In the autonomous resource selection mode of UE, the UE periodically reserves a certain resource based on a sensing result in a period of time.

In LTE V2X, the main consideration is to support a basic safety service, most of which are periodic services with a fixed packet size. In autonomous resource selection mode of LTE V2X, a minimum resource reservation period that can be selected by the UE is 20 ms.

In NR V2X, in addition to the periodic services with a fixed packet size, there are also a periodic service with a variable packet size and an aperiodic service, and some data packets require a shorter delay (for example, a minimum end-to-end delay is 3 ms). Therefore, reserving a resource in a fixed period (20 ms) in LTE V2X is already difficult to meet the requirement.

SUMMARY

The embodiments of the present disclosure provide a resource selection method and a terminal, to resolve the problem that reserving a resource in a fixed period in NR V2X is difficult to meet the requirement.

To resolve the foregoing technical problem, the present disclosure is implemented as follows:

According to a first aspect, an embodiment of this disclosure provides a resource selection method, applied to a terminal. The method includes:

determining a target transmission resource of a to-be-transmitted data packet, where the target transmission resource is selected from one of the following:
a periodically reserved transmission resource obtained according to a sensing result of a first sensing window;
a transmission resource obtained according to a sensing result of a second sensing window, where a start time of the second sensing window is or later than an arrival time of the data packet; and
a randomly selected transmission resource.

According to a second aspect, an embodiment of the present disclosure provides a terminal, including:

a determining module, configured to determine a target transmission resource of a to-be-transmitted data packet, where the target transmission resource is selected from one of the following:
a periodically reserved transmission resource obtained according to a sensing result of a first sensing window;
a transmission resource obtained according to a sensing result of a second sensing window, where a start time of the second sensing window is or later than an arrival time of the data packet; and
a randomly selected transmission resource.

According to a third aspect, an embodiment of the present disclosure provides a terminal, including a processor, a memory, and a computer program that is stored in the memory and that can run on the processor. When the computer program is executed by the processor, steps of the foregoing resource selection method are implemented.

According to a fourth aspect, an embodiment of the present disclosure provides a computer readable storage medium. The computer readable storage medium stores a computer program, and when the computer program is executed by a processor, steps of the foregoing resource selection method are implemented.

In the embodiments of the present disclosure, during selection of the transmission resource of the to-be-transmitted data packet, different manners may be selected according to the specific requirements of the to-be-transmitted data packet to determine the target transmission resource, so that the resource allocation mechanism can meet the periodic service with a fixed packet size, the periodic service with a variable packet size, and the aperiodic service, to reduce the data packet transmission delay, ensure the reliability of data packet transmission, reduce the proportion of reserved resource waste, and improve system resource utilization and spectrum efficiency.

BRIEF DESCRIPTION OF DRAWINGS

It becomes clear for a person of ordinary skill in the art to learn various other advantages and benefits by reading detailed description of the following optional implementation manners. Accompanying drawings are merely used for showing the optional implementation manners, and are not considered as a limitation on the present disclosure. In addition, in all the accompanying drawings, same reference numerals are used to indicate the same component. In the accompanying drawings:

FIG. 1 is a schematic flowchart of a resource selection method according to an embodiment of the present disclosure;

FIG. 2 is a schematic diagram of a resource selection method according to a first embodiment of the present disclosure;

FIG. 3 is a schematic diagram of a resource selection method according to a second embodiment of the present disclosure;

DETAILED DESCRIPTION OF EMBODIMENTS

Figure 4:
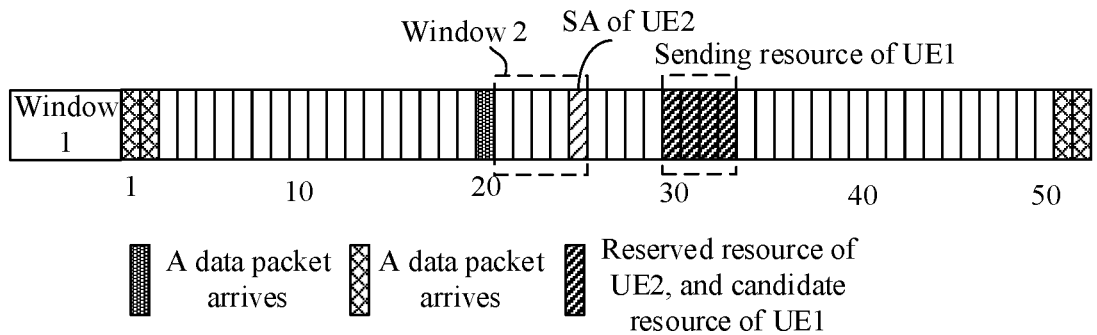
FIG. 4 is a schematic diagram of a resource selection method according to a fifth embodiment of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

Referring to FIG. 1, FIG. 1 is a schematic flowchart of a resource selection method according to an embodiment of the present disclosure. The resource selection method is applied to a terminal and includes:

Step 11: Determine a target transmission resource of a to-be-transmitted data packet, where the target transmission resource is selected from one of the following:

1) a periodically reserved transmission resource obtained according to a sensing result of a first sensing window;
2) a transmission resource obtained according to a sensing result of a second sensing window, where a start time of the second sensing window is or later than an arrival time of the data packet; and
3) a randomly selected transmission resource.

In the embodiments of the present disclosure, during selection of the transmission resource of the to-be-transmitted data packet, different manners may be selected according to the specific requirements of the to-be-transmitted data packet to determine the target transmission resource, so that the resource allocation mechanism can meet the periodic service with a fixed packet size, the periodic service with a variable packet size, and the aperiodic service, to reduce the data packet transmission delay, ensure the reliability of data packet transmission, reduce the proportion of reserved resource waste, and improve system resource utilization and spectrum efficiency.

In the embodiments of the present disclosure, the transmission resource includes at least one of a time domain resource, a frequency domain resource, a code domain resource, a space domain resource, and power. For example, the time domain resource is a slot (slot), a subframe (subframe), a symbol (symbol), or a frame (frame). For example, the frequency domain resource is a subchannel (subchannel), a physical resource block (Physical Resource Block, PRB), or a subcarrier (subcarrier). For example, the code domain resource is a sequence. For example, the space domain resource is a port number.

In the embodiments of the present disclosure, the target transmission resource is one resource or a plurality of resources. For example, when the transmission resource is the time domain resource, the target transmission resource may be one slot (slot) or a plurality of slots, for example, two slots.

When the target transmission resource is a plurality of resources, the plurality of resources are a plurality of continuous time domain resources, a plurality of discontinuous time domain resources, a plurality of continuous frequency domain resources, a plurality of discontinuous frequency domain resources, and/or a plurality of candidate patterns (pattern). The so-called discontinuous time domain resource refers to that the plurality of resources include at least one resource that is discontinuous with other resources in time domain. Similarly, the so-called discontinuous frequency domain resource refers to that the plurality of resources include at least one resource that is discontinuous with other resources in frequency domain.

In the embodiments of the present disclosure, an end time of the first sensing window (sensing window) is earlier than the arrival time of the data packet, and the first sensing window may be determined in one of the following manners:

configured by a base station or the terminal;
preconfigured by a base station or a terminal; and
predefined in a protocol.

In the embodiments of the present disclosure, the second sensing window may be determined in one of the following manners:

determined by the terminal according to at least one of a delay and a quality of service (Quality of Service, QoS) parameter of the data packet;
configured by a base station or the terminal;
preconfigured by a base station or a terminal; and
predefined in a protocol.

In some embodiments of the present disclosure, the start time of the second sensing window can be or later than the arrival time of the data packet, and the end time of the second sensing window can be a time at which an available resource is sensed, or the second sensing window can be a fixed sensing time. In the sensing time, if many available resources are sensed, one or more of the available resources are selected.

In the embodiments of the present disclosure, the periodically reserved transmission resource is in the first resource selection window (selection window), and the first resource selection window is determined in one of the following manners:

configured by a base station or the terminal;
preconfigured by a base station or a terminal; and
predefined in a protocol.

In some embodiments of the present disclosure, the transmission resource obtained according to the sensing result of the second sensing window is in the second resource selection window, and the second resource selection window is determined in one of the following manners:

determined by the terminal according to at least one of a delay and a QoS parameter of the data packet;
configured by a base station or the terminal;
preconfigured by a base station or a terminal; and
predefined in a protocol.

In the embodiments of the present disclosure, the second resource selection window is after the second sensing window, and the end time of the second resource selection window is earlier than the sum of the arrival time of the data packet and the delay of the data packet, so that the data packet can be transmitted within a required delay range, to ensure the reliability of data packet transmission.

In the embodiments of the present disclosure, the randomly selected transmission resource is in the third resource selection window, and the third resource selection window is determined in one of the following manners:
 determined by the terminal according to at least one of a delay and a QoS parameter of the data packet; configured by a base station or the terminal;
 preconfigured by a base station or a terminal; and
 predefined in a protocol.

Optionally, the end time of the third resource selection window is earlier than the sum of the arrival time of the data packet and the delay of the data packet, so that the data packet can be transmitted within a required delay range, to ensure the reliability of data packet transmission.

The third resource selection window can be the same as or different from the second resource selection window.

The method for determining the target transmission resource of the to-be-transmitted data packet is described in detail below.

In some embodiments of the present disclosure, the resource selection method may include:
 Step 21: Sense a specified transmission resource in the first sensing window, to obtain a sensing result; and periodically reserve a first quantity of transmission resources according to the sensing result.

In the embodiments of the present disclosure, specifically, sensing is performed in the first sensing window, that is, control information (such as scheduling assignment (Scheduling Assignment, SA) or sidelink control information (Sidelink Control Information, SCI)) is sensed and measurement is performed in each sensing transmission time interval (Transmission Time Interval, TTI) of the first sensing window. That is, the sensing result includes: a sensing result of control information and/or a measurement result.

In the embodiments of the present disclosure, the control information may include: at least one of time domain information, frequency domain information, a resource reservation indicator, a resource occupancy indicator, and a priority. The resource reservation indicator and the resource occupancy indicator can include at least one of the following: a time domain resource indication, a frequency domain resource indication, a resource number, and the like. The resource reservation indicator is used to indicate a reserved resource (or a number of resources). For example, if four slots are reserved continuously and the resource reservation indicator is 2, it indicates that two slots are occupied continuously.

The measurement includes: at least one of interference measurement, radio resource management (Radio Resource Management, RRM) measurement, and channel occupancy measurement. The measurement result includes: at least one of an interference measurement result, an RRM measurement result, and a channel occupancy measurement result. The measured content is, for example, reference signal received power (Reference Signal Receiving Power, RSRP), reference signal received quality (Reference Signal Receiving Quality, RSRQ), received signal strength indicator (Received Signal Strength Indication, RSSI), and/or energy.

According to the sensing result, the terminal can exclude a resource in the following manners:
 a. Exclude a resource of a TTI for sending data by the terminal.
 b. Exclude a reserved resource derived from control information obtained through demodulation.
 c. According to an interference measurement result, exclude a resource with large interference.

In the first resource selection window, a first quantity of transmission resources are randomly selected from a specified proportion (such as 20%) of resources with minimum interference to reserve resources periodically.

In the embodiments of the present disclosure, the first quantity is determined in one of the following manners:
 determined by the terminal according to at least one of parameters of a transmission block size (Transport Block Size, TBS), a service type, a QoS parameter, a subcarrier spacing, a transmission rate, a modulation and coding scheme (Modulation and Coding Scheme, MCS), and a layer number;
 configured by a base station or the terminal;
 preconfigured by a base station or a terminal; and
 predefined in a protocol.

As can be seen, the number of reserved transmission resources is not fixed, and can be changed according to the demand, so that the resource allocation mechanism can meet the periodic service with a fixed packet size, the periodic service with a variable packet size, and the aperiodic service.

In the embodiments of the present disclosure, the specified transmission resource can be all or some of available transmission resources, and the specified transmission resource is determined in one of the following manners:
 determined by the terminal according to at least one of a priority, a QoS parameter, a subcarrier spacing (SCS), a service type (unicast, multicast, and broadcast), and a measurement result (such as channel busy ratio);
 configured by the terminal and the base station;
 preconfigured by the terminal and the base station; and
 predefined in a protocol.

For example, it may be configured that a specified transmission resource corresponding to the broadcast service is a resource pool 1.

Step 22: Determine whether the reserved transmission resource satisfies performance of the data packet. If yes, perform step 23. If not, perform step 24a or step 24b.

In the embodiments of the present disclosure, the performance includes: at least one of a delay, a QoS parameter, a transmission block size, a modulation and coding scheme, a layer number, and a transmission rate.

In the embodiments of the present disclosure, the reserved transmission resource satisfying the performance of the data packet satisfies at least one of the following conditions:
 a minimum time interval from the data packet is less than a specified threshold; and
 greater than a resource required by the data packet.

The specified threshold is defined according to the delay and/or the QoS parameter of the data packet and the like.

Step 23: If yes, select the reserved transmission resource as the target transmission resource of the to-be-transmitted data packet. That is, the target transmission resource is selected from the transmission resource in the above 1).

Step 24a: If not, sense a specified transmission resource in the second sensing window, to obtain a sensing result; and determine whether there is an available transmission resource according to the sensing result.

Alternatively,

Step 24b: If not, randomly select a transmission resource as the target transmission resource. That is, the target transmission resource is selected from the transmission resource in 3) above.

Alternatively,

Step 24c: If not, select an available transmission resource as the target transmission resource according to a history sensing result of sensing in the first sensing window. In the above step 24a, the sensing includes sensing control information of another terminal in the second sensing window, that is, the sensing result includes: the sensing result of the control information. The sensing may also include measurement.

The control information includes: at least one of time domain information, frequency domain information, a resource reservation indicator, a resource occupancy indicator, and a priority.

In this embodiment of the present disclosure, the available transmission resource includes at least one of the following:
- a transmission resource not reserved by the terminal and another terminal;
- a transmission resource whose measurement result is less than a preset threshold;
- a reserved transmission resource on which a priority of another terminal is lower than a priority of the data packet;
- an unoccupied transmission resource of reserved transmission resources on which a priority of another terminal is higher than a priority of the data packet; and
- an unoccupied transmission resource of reserved transmission resources of another terminal.

The measurement result is obtained through the sensing by the terminal in the second sensing window, and is at least one of an interference measurement result, a radio resource management (RRM) measurement result, and a channel occupancy measurement result.

Step 24a1: If yes, select the available transmission resource as the target transmission resource. That is, the target transmission resource is selected from the transmission resource in 2) above.

Step 24a2: If not, randomly select a transmission resource as the target transmission resource. That is, the target transmission resource is selected from the transmission resource in 3) above. Alternatively, if not, the transmission resource is reselected.

In the embodiment of the present disclosure, the periodically reserved transmission resource in the above 1) is preferentially selected as the target transmission resources. If the periodically reserved transmission resource in 1) does not meet the performance of the data packet, the transmission resource in 2) or 3) is selected as the target transmission resource, so that the resource allocation mechanism can meet the performance of the data packet, to ensure the reliability of data packet transmission, reduce the proportion of reserved resource waste, and improve system resource utilization and spectrum efficiency.

In some other embodiments of the present disclosure, the resource selection method may include:

Step 31: Sense a specified transmission resource in the second sensing window, to obtain a sensing result.

In the above step 31, the sensing includes sensing control information of another terminal in the first sensing window, that is, the sensing result includes: the sensing result of the control information. The sensing may also include measurement.

The control information includes: at least one of time domain information, frequency domain information, a resource reservation indicator, a resource occupancy indicator, and a priority.

In the embodiments of the present disclosure, the specified transmission resource is a transmission resource corresponding to the data packet, and the specified transmission resource is determined in one of the following manners:
- determined by the terminal according to at least one of a priority, a QoS parameter, a subcarrier spacing, a service type, and a measurement result;
- configured by the terminal and the base station;
- preconfigured by the terminal and the base station; and
- predefined in a protocol.

Step 32: Determine whether there is an available transmission resource according to the sensing result.

In this embodiment of the present disclosure, the available transmission resource includes at least one of the following:
- a transmission resource not reserved by the terminal and another terminal;
- a transmission resource whose measurement result is less than a preset threshold;
- a reserved transmission resource on which a priority of another terminal is lower than a priority of the data packet;
- an unoccupied transmission resource of reserved transmission resources on which a priority of another terminal is higher than a priority of the data packet; and
- an unoccupied transmission resource of reserved transmission resources of another terminal.

Step 33a: If yes, select the available transmission resource as the target transmission resource. That is, the target transmission resource is selected from the transmission resource in 2) above.

Step 33b: If not, randomly select a transmission resource as the target transmission resource. That is, the target transmission resource is selected from the transmission resource in 3) above. Alternatively, if not, the transmission resource is reselected.

In the embodiment of the present disclosure, the transmission resource in the above 2) is preferentially selected as the target transmission resources. If there is no available transmission resource in 2), the transmission resource is randomly selected according to the above 3), so that the resource allocation mechanism can meet the performance of the data packet, to ensure the reliability of data packet transmission, reduce the proportion of reserved resource waste, and improve system resource utilization and spectrum efficiency.

In some other embodiments of the present disclosure, the resource selection method may include:

Step 41: Randomly select a transmission resource as the target transmission resource.

In the embodiments of the present disclosure, the transmission resource is randomly selected directly according to the above 3).

The resource selection method in the above embodiments of the present disclosure is applicable to an NR sidelink system, and certainly is also applicable to other communication systems and other scenarios.

The resource selection method in the above embodiments of the present disclosure can be used for NR V2X services, which can be divided into three categories: a periodic fixed packet, a periodic variable packet, and an aperiodic data packet, as shown in the following table:

| Usage example | Maximum end-to-end delay | Reliability (%) | load (Bytes) | Data rate (Mbps) |
|---|---|---|---|---|
| Platooning | 10-500 | 90-99.99 | 50-6500 | 50-65 |
| Extend sensors (Extend sensors) | 3-100 | 95-99.999 | 1600 | 10-1000 |
| (Advanced driving) Advanced Driving | 3-100 | 90-99.999 | 300-12000 | 10-53 |
| Remote driving (Remote Driving) | 5 | 99.999 | | uplink: 25/downlink: 1 |

In the embodiments of the present disclosure, during selection of the transmission resource of the to-be-transmitted data packet, different manners may be selected according to the specific requirements of the to-be-transmitted data packet to determine the target transmission resource, so that the resource allocation mechanism can meet the periodic service with a fixed packet size, the periodic service with a variable packet size, and the aperiodic service, to reduce the data packet transmission delay, ensure the reliability of data packet transmission, reduce the proportion of reserved resource waste, and improve system resource utilization and spectrum efficiency.

The resource selection method of the present disclosure is described below with reference to specific embodiments:

In a first embodiment of the present disclosure:

Referring to FIG. 2, the resource selection method in this embodiment of the present disclosure includes the following steps:

1. A base station configures a priority and/or a service type (unicast, multicast, and broadcast) of each transmission resource (such as a resource pool (pool)).
  a) It is assumed that the broadcast service corresponds to pool #1.
2. The base station configures a first sensing window length, that is, a window 1, and a second sensing window length, that is, a window 2 for UE1, where the resource reservation period is 50 ms, and the number of reserved resources is two slots.
3. When UE1 is to send a broadcast service, UE1 senses in pool 1 (that is, the specified transmission resource in the above embodiment).
  a) In window 1, UE1 demodulates an SA (SA of another UE) in a sensing slot and performs energy sensing to obtain an interference status in a resource (not limited to energy sensing, and may also be RSRP measurement or channel occupancy ratio measurement, etc.)
  b) UE1 excludes a reserved resource indicated by the SA, calculates a measurement result of average RSSI of every two slots, selects 20% transmission resources (not limited to 20% transmission resources, and can be determined according to a configuration or a fixed value) with minimum interference, and randomly selects two consecutive slots from the transmission resources for resource reservation.
  c) UE1 reserves a resource of two slots every 50 ms in the selection window.
  d) If a data packet arrives at a moment t=40 ms, a delay of the data packet is required to be 20 ms.
    i. UE1 calculates a time interval between the data packet and a latest available candidate resource (t=50 ms), that is, 50−40=10 ms. 10 ms is less than the delay requirement of 20 ms, and UE1 sends the data packet when t=50 ms.

In a second embodiment of the present disclosure:

Referring to FIG. 3, the resource selection method in this embodiment of the present disclosure includes the following steps:

1. A base station configures a priority and/or a service type of each transmission resource (such as a resource pool (pool)).
  a) It is assumed that the broadcast service corresponds to pool #1.
2. The base station configures a first sensing window length, that is, a window 1, and a second sensing window length, that is, a window 2 for UE1, where the resource reservation period is 50 ms, and the number of reserved resources is two slots.
3. When UE1 is to send a broadcast service, UE1 senses in pool 1.
  a) In window 1, UE1 demodulates an SA (SA of another UE) in a sensing slot and performs energy sensing to obtain an interference status in a resource (not limited to energy sensing, and may also be RSRP measurement or channel occupancy ratio measurement, etc.)
  b) UE1 excludes a reserved resource indicated by the SA, calculates a measurement result of average RSSI of every two slots, selects 20% resources (not limited to 20% transmission resources, and can be determined according to a configuration or a fixed value) with minimum interference, and randomly selects two consecutive slots from the transmission resources for resource reservation.
  c) UE1 reserves a resource of two slots every 50 ms in the selection window.
  d) If a data packet arrives at a moment t=20 ms, a delay of the data packet is required to be 20 ms.
    i. UE1 calculates a time interval between the data packet and a latest available candidate resource (t=50 ms), that is, 50−20=30 ms. 30 ms is greater than the delay requirement of 20 ms.
    ii. UE1 senses in each sensing TTI from t=20 ms in window 2.
      1. If at t=25 ms, it is demodulated that an SA (SA of UE2) indicates that its reserved resource is a resource of four consecutive slots from t=30 ms (at 15 kHz, that is, the reserved resource is a resource of four slots of T=30, 31, 32, and 33), UE2 only sends in one slot of T=30. UE1 sends an SA between T=26 ms and T=30 ms, and indication data is sent in the slots of T=31 and 32.

In a third embodiment of the present disclosure:

The resource selection method in this embodiment of the present disclosure includes the following steps:

1. A base station configures a priority and/or a service type of each transmission resource (such as a resource pool (pool)).
  a) It is assumed that the broadcast service corresponds to pool #1.

2. The base station configures a first sensing window length, that is, a window 1, and a second sensing window length, that is, a window 2 for UE1, where the resource reservation period is 50 ms, and the number of reserved resources is two slots.
3. When UE1 is to send a broadcast service, UE1 senses in pool 1.
  a) In window 1, UE1 demodulates an SA (SA of another UE) in a sensing slot and performs energy sensing to obtain an interference status in a resource (not limited to energy sensing, and may also be RSRP measurement or channel occupancy ratio measurement, etc.)
  b) UE1 excludes a reserved resource indicated by the SA, calculates a measurement result of average RSSI of every two slots, selects 20% resources (not limited to 20% transmission resources, and can be determined according to a configuration or a fixed value) with minimum interference, and randomly selects two consecutive slots from the transmission resources for resource reservation.
  c) UE1 reserves a resource of two slots every 50 ms in the selection window.
  d) If a data packet arrives at a moment t=20 ms, a delay of the data packet is required to be 20 ms.
    i. UE1 calculates a time interval between the data packet and a latest available candidate resource (t=50 ms), that is, 50−20=30 ms. 30 ms is greater than the delay requirement of 20 ms.
      1. UE1 senses in each sensing TTI from t=20 ms in window 2.
      2. If the SA is demodulated in window 2 to obtain that no idle resource is available, UE randomly selects a slot n (n<40) to send a data packet.
      3. UE1 carries resource indication information in the SA to indicate that candidate resource 1 is used to transmit in two consecutive slots.

In a fourth embodiment of the present disclosure:
The resource selection method in this embodiment of the present disclosure includes the following steps:
1. A base station configures a priority and/or a service type of each transmission resource (such as a resource pool (pool)).
  a) It is assumed that the broadcast service corresponds to pool #1.
2. The base station configures a first sensing window length, that is, a window 1, and a second sensing window length, that is, a window 2 for UE1, where the resource reservation period is 50 ms, and the number of reserved resources is two slots.
3. When UE1 is to send a broadcast service, UE1 senses in pool 1.
  a) In window 1, UE1 demodulates an SA (SA of another UE) in a sensing slot and performs energy sensing to obtain an interference status in a resource (not limited to energy sensing, and may also be RSRP measurement or channel occupancy ratio measurement, etc.)
  b) UE1 excludes a reserved resource indicated by the SA, calculates a measurement result of average RSSI of every two slots, selects 20% resources (not limited to 20% transmission resources, and can be determined according to a configuration or a fixed value) with minimum interference, and randomly selects two consecutive slots from the transmission resources for resource reservation.
  c) UE1 reserves a resource of two slots every 50 ms in the selection window.
  d) If a data packet arrives at a moment t=40 ms, a delay of the data packet is required to be 20 ms.
    i. UE1 calculates a time interval between the data packet and a latest available candidate resource (t=50 ms), that is, 50−40=10 ms. 10 ms is less than the delay requirement of 20 ms.
    ii. UE1 calculates to obtain that transmission of a current transport block (TB) needs a resource of four slots, and there are two reserved slots for t=50 ms. Therefore, the resource is insufficient.
    iii. UE1 senses in each sensing TTI from t=40 ms in window 2.
      1. If at t=40 ms, it is demodulated that an SA (SA of UE3) indicates that its reserved resource is a resource of four consecutive slots from t=42 ms (at 15 kHz, that is, the reserved resource is a resource of four slots of T=42, 43, 44, and 45), UE2 only sends in one slot of T=42. UE1 sends an SA at T=41 ms, and indication data is sent in the slots of T=43, 44, and 45. If UE1 senses that the next available slot is a slot of T=48, the remaining data can be sent in the slot of T=48.

In a fifth embodiment of the present disclosure:
Referring to FIG. 4, the resource selection method in this embodiment of the present disclosure includes the following steps:
1. A base station configures a priority and/or a service type of each transmission resource (such as a resource pool (pool)).
  a) It is assumed that the broadcast service corresponds to pool #1.
2. The base station configures a first sensing window length, that is, a window 1, and a second sensing window length, that is, a window 2 for UE1, where the resource reservation period is 50 ms, and the number of reserved resources is two slots.
3. When UE1 is to send a broadcast service (a priority is 1), UE1 senses in pool 1.
  a) In window 1, UE1 demodulates an SA (SA of another UE) in a sensing slot and performs energy sensing to obtain an interference status in a resource (not limited to energy sensing, and may also be RSRP measurement or channel occupancy ratio measurement, etc.)
  b) UE1 excludes a reserved resource indicated by the SA, calculates a measurement result of average RSSI of every two slots, selects 20% resources (not limited to 20% transmission resources, and can be determined according to a configuration or a fixed value) with minimum interference, and randomly selects two consecutive slots from the transmission resources for resource reservation.
  c) UE1 reserves a resource of two slots every 50 ms in the selection window.
  d) If a data packet arrives at a moment t=20 ms, a delay of the data packet is required to be 20 ms.
    i. UE1 calculates a time interval between the data packet and a latest available candidate resource (t=50 ms), that is, 50−20=30 ms. 30 ms is greater than the delay requirement of 20 ms.
    ii. UE1 senses in each sensing TTI from t=20 ms in window 2.
      1. In the time window from 20 ms to 40 ms, UE1 demodulates the SA (SA of UE2) on the sensing resource to obtain information such as a service priority (which is 4), and its reserved resource is a resource of four consecutive slots from t=30 ms (at 15 kHz, that is, the reserved resource is a resource of four slots of T=30, 31, 32, and 33).

a) If the service priority of UE2 is lower than that of the to-be-transmitted data packet of UE1, the reserved resources of UE2 can all be used as the candidate resource of UE1 (that is, t=30, 31, 32, 33 are used as the candidate resource of UE1).

In a sixth embodiment of the present disclosure:

The resource selection method in this embodiment of the present disclosure includes the following steps:

1. A base station configures a priority and/or a service type of each transmission resource (such as a resource pool (pool)).
   a) The broadcast service corresponds to pool #1.
2. When UE1 is to send a broadcast service (a priority is 1):
   a) There is no available resource within the delay range. UE1 senses from t=20 ms in each sensing TTI in pool #1 in window 2.
      i. In the time window from 20 ms to 40 ms, UE1 demodulates the SA (SA of UE2) on the sensing resource to obtain information such as a service priority (which is 4), and its reserved resource is a resource of four consecutive slots from t=30 ms (at 15 kHz, that is, the reserved resource is a resource of four slots of T=30, 31, 32, and 33).
      1. If the service priority of UE2 is lower than that of the to-be-transmitted data packet of UE1, the reserved resources of UE2 can all be used as the candidate resource of UE1 (that is, t=30, 31, 32, 33 are used as the candidate resource of UE1).

Figure 5:
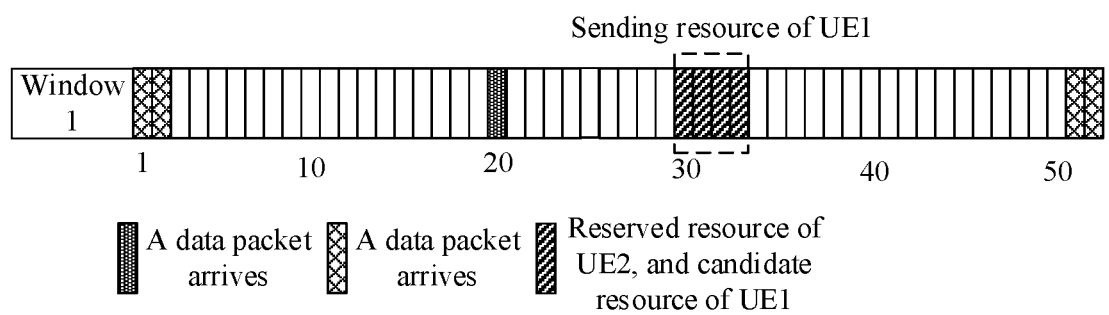
FIG. 5 is a schematic diagram of a resource selection method according to a sixth embodiment of the present disclosure.

In a seventh embodiment of the present disclosure:

Referring to FIG. 5, the resource selection method in this embodiment of the present disclosure includes the following steps:

1. A base station configures a priority and/or a service type of each transmission resource (such as a resource pool (pool)).
   a) It is assumed that the broadcast service corresponds to pool #1.
2. The base station configures a first sensing window length, that is, a window 1 for UE1, where the resource reservation period is 50 ms, and the number of reserved resources is two slots.
3. When UE1 is to send a broadcast service (a priority is 1), UE1 senses in pool 1.
   a) In window 1, UE1 demodulates an SA (SA of another UE) in a sensing slot and performs energy sensing to obtain an interference status in a resource (not limited to energy sensing, and may also be RSRP measurement or channel occupancy ratio measurement, etc.)
   b) UE1 excludes a reserved resource indicated by the SA, calculates a measurement result of average RSSI of every two slots, selects 20% resources with minimum interference, and randomly selects two consecutive slots from the resources for resource reservation.
   c) UE1 reserves a resource of two slots every 50 ms in the selection window.
   d) If a data packet arrives at a moment t=20 ms, a delay of the data packet is required to be 20 ms.
      i. UE1 calculates a time interval between the data packet and a latest available candidate resource (t=50 ms), that is, 50−20=30 ms. 30 ms is greater than the delay requirement of 20 ms.
      ii. UE selects the resource with a low priority as the candidate resource. If t=30, 31, 32, and 33 are reserved with a lower priority, they are used as candidate resources of UE1.

In the embodiment of the present disclosure, instead of sensing the control information, the priority of the reserved resource can be obtained according to historical information (including the priority of the reserved resource) of sensing in window 1. If the priority is low, the resource is used as a candidate resource of UE1.

Figure 6:
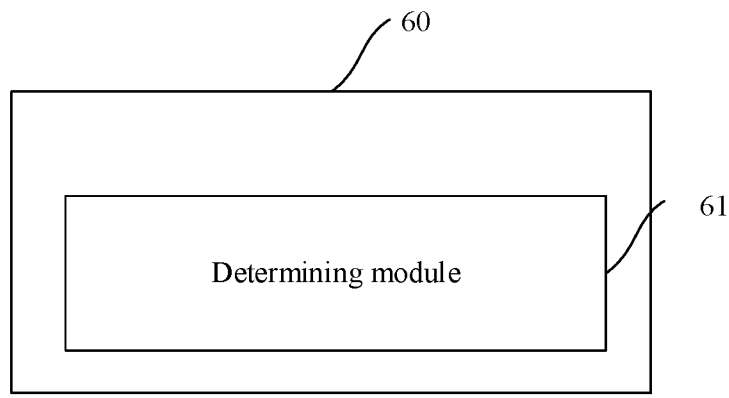
FIG. 6 is a schematic structural diagram of a terminal according to an embodiment of this disclosure.

Based on the same inventive idea, referring to FIG. 6, FIG. 6 is a schematic structural diagram of a terminal according to an embodiment of the present disclosure. The terminal 60 includes:

a determining module 61, configured to determine a target transmission resource of a to-be-transmitted data packet, where the target transmission resource is selected from one of the following:

a periodically reserved transmission resource obtained according to a sensing result of a first sensing window;

a transmission resource obtained according to a sensing result of a second sensing window, where a start time of the second sensing window is or later than an arrival time of the data packet; and a randomly selected transmission resource.

Optionally, the terminal also includes:

a first sensing module, configured to sense a specified transmission resource in the first sensing window, to obtain a sensing result; and periodically reserve a first quantity of transmission resources according to the sensing result.

Optionally, the first quantity is determined in one of the following manners:

determined by the terminal according to at least one of parameters of a transmission block size, a service type, a quality of service QoS parameter, a subcarrier spacing, a transmission rate, a modulation and coding scheme, and a layer number;

configured by a base station or the terminal;

preconfigured by a base station or a terminal; and predefined in a protocol.

Optionally, the determining module is configured to determine whether the reserved transmission resource satisfies performance of the data packet; and if yes, select the reserved transmission resource as the target transmission resource.

Optionally, the performance includes: at least one of a delay, a QoS parameter, a transmission block size, a modulation and coding scheme, a layer number, and a transmission rate.

Optionally, the reserved transmission resource satisfying the performance of the data packet satisfies at least one of the following conditions:

a minimum time interval from the data packet is less than a specified threshold; and greater than a resource required by the data packet.

Optionally, the determining module is configured to: if not, sense a specified transmission resource in the second sensing window, to obtain a sensing result; and determine whether there is an available transmission resource according to the sensing result; and if yes, select the available transmission resource as the target transmission resource.

Optionally, the determining module is configured to: if not, randomly select a transmission resource as the target transmission resource.

Optionally, the determining module is configured to: if not, randomly select a transmission resource as the target transmission resource.

Optionally, the determining module is configured to: sense a specified transmission resource in the second sensing window, to obtain a sensing result; and determine whether there is an available transmission resource according to the sensing result; and if yes, select the available transmission resource as the target transmission resource.

Optionally, the determining module is configured to: if not, randomly select a transmission resource as the target transmission resource.

Optionally, the second sensing window is determined in one of the following manners:
determined by the terminal according to at least one of a delay and a QoS parameter of the data packet;
configured by a base station or the terminal;
preconfigured by a base station or a terminal; and
predefined in a protocol.

Optionally, the available transmission resource includes at least one of the following:
a transmission resource not reserved by the terminal and another terminal;
a transmission resource whose measurement result is less than a preset threshold;
a reserved transmission resource on which a priority of another terminal is lower than a priority of the data packet;
an unoccupied transmission resource of reserved transmission resources on which a priority of another terminal is higher than a priority of the data packet; and
an unoccupied transmission resource of reserved transmission resources of another terminal.

Optionally, the determining module is configured to: randomly select a transmission resource as the target transmission resource.

Optionally, the sensing result includes: a sensing result of control information and/or a measurement result.

Optionally, the control information includes: at least one of time domain information, frequency domain information, a resource reservation indicator, a resource occupancy indicator, and a priority.

Optionally, the measurement result includes: at least one of an interference measurement result, a radio resource management RRM measurement result, and a channel occupancy measurement result.

Optionally, the periodically reserved transmission resource is in the first resource selection window, and the first resource selection window is determined in one of the following manners:
configured by a base station or the terminal;
preconfigured by a base station or a terminal; and
predefined in a protocol.

Optionally, the transmission resource obtained according to the sensing result of the second sensing window is in the second resource selection window, and the second resource selection window is determined in one of the following manners:
determined by the terminal according to at least one of a delay and a QoS parameter of the data packet;
configured by a base station or the terminal;
preconfigured by a base station or a terminal; and
predefined in a protocol.

Optionally, the randomly selected transmission resource is in the third resource selection window, and the third resource selection window is determined in one of the following manners:
determined by the terminal according to at least one of a delay and a QoS parameter of the data packet;
configured by a base station or the terminal;
preconfigured by a base station or a terminal; and
predefined in a protocol.

Optionally, the transmission resource includes at least one of a time domain resource, a frequency domain resource, a code domain resource, a space domain resource, and power.

Optionally, the target transmission resource is one resource or a plurality of resources; and
when the target transmission resource is a plurality of resources, the plurality of resources are a plurality of continuous time domain resources, a plurality of discontinuous time domain resources, a plurality of continuous frequency domain resources, a plurality of discontinuous frequency domain resources, and/or a plurality of candidate patterns.

Optionally, the specified transmission resource is a transmission resource corresponding to the data packet, and the specified transmission resource is determined in one of the following manners:
determined by the terminal according to at least one of a priority, a QoS parameter, a subcarrier spacing, a service type, and a measurement result;
configured by the terminal and the base station;
preconfigured by the terminal and the base station; and
predefined in a protocol.

Figure 7:
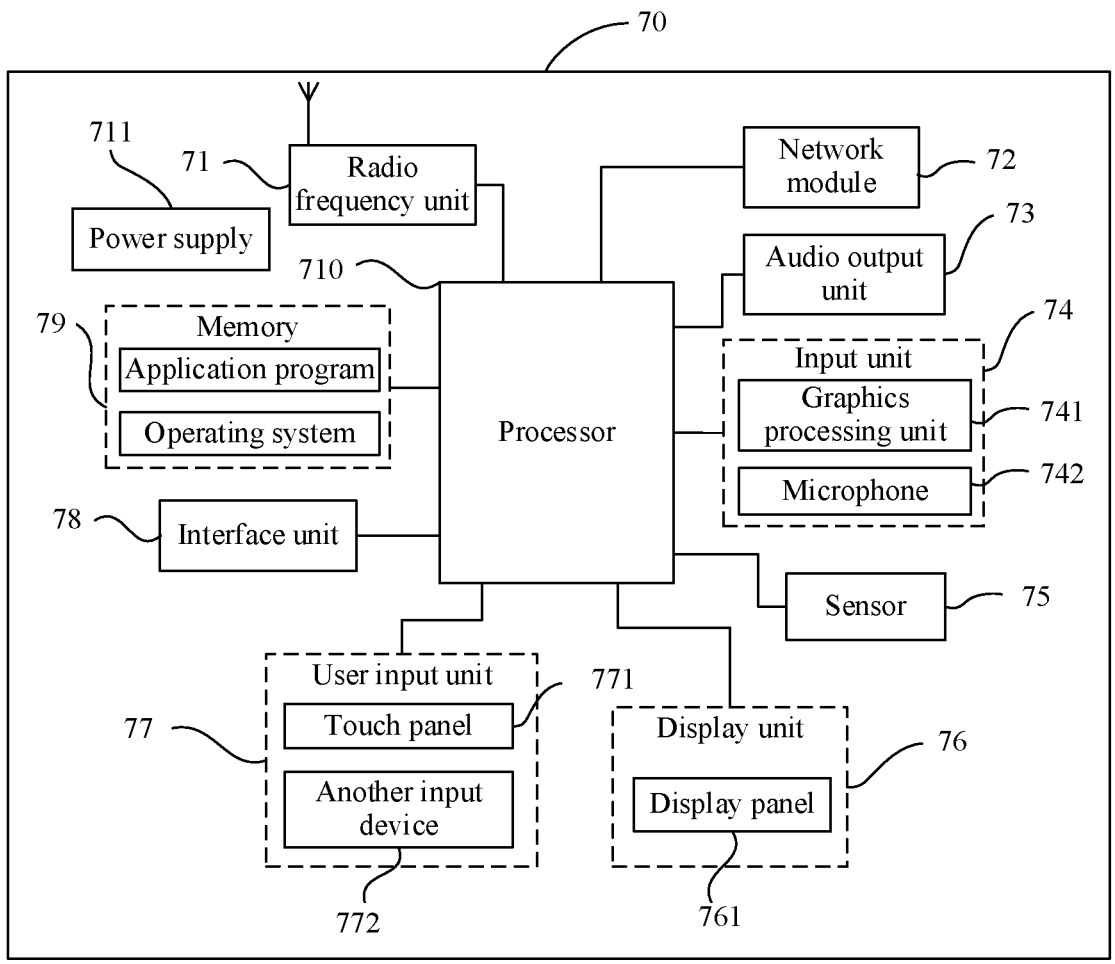
FIG. 7 is a schematic structural diagram of a terminal according to another embodiment of this disclosure.

Referring to FIG. 7, FIG. 7 is a schematic structural diagram of a terminal according to another embodiment of the present disclosure. The terminal 70 includes but is not limited to:
a radio frequency unit 71, a network module 72, an audio output unit 73, an input unit 74, a sensor 75, a display unit 76, a user input unit 77, an interface unit 78, a memory 79, a processor 710, a power supply 711, and other components. Those skilled in the art may understand that the terminal structure shown in FIG. 7 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 710 is configured to determine a target transmission resource of a to-be-transmitted data packet, where the target transmission resource is selected from one of the following:
1) a periodically reserved transmission resource obtained according to a sensing result of a first sensing window;
2) a transmission resource obtained according to a sensing result of a second sensing window, where a start time of the second sensing window is or later than an arrival time of the data packet; and
3) a randomly selected transmission resource.

In the embodiments of the present disclosure, during selection of the transmission resource of the to-be-transmitted data packet, different manners are used according to the specific requirements of the to-be-transmitted data packet to select the target transmission resource, so that the resource allocation mechanism can meet the periodic service with a fixed packet size, the periodic service with a variable packet size, and the aperiodic service, to reduce the data packet transmission delay, ensure the reliability of data packet transmission, reduce the proportion of reserved resource waste, and improve system resource utilization and spectrum efficiency.

It should be understood that in the embodiments of the present disclosure, the radio frequency unit 71 can be configured to receive and send information or receive and send signal during calls. Specifically, the radio frequency unit 71 receives downlink data from a base station, and transmits the downlink data to the processor 710 for processing. In addition, the radio frequency unit 71 sends uplink data to the base station. Generally, the radio frequency unit 71 includes but is not limited to an antenna, at least one amplifier, a transceiver, a coupler, a low noise amplifier, a duplexer, and the like. In addition, the radio frequency unit 71 may further communicate with another device by using a wireless communications system and network.

The terminal provides wireless broadband Internet access for a user by using the network module 72, for example, helps the user send and receive an email, browse a web page, and access streaming media.

The audio output unit 73 may convert audio data received by the radio frequency unit 71 or the network module 72 or stored in the memory 79 into an audio signal and output the audio signal as a sound. Moreover, the audio output unit 73 may further provide audio output (for example, call signal receiving sound and message receiving sound) related to a specific function performed by the terminal 70. The audio output unit 73 includes a speaker, a buzzer, a telephone receiver, and the like.

The input unit 74 is configured to receive audio or video signals. The input unit 74 may include a graphics processing unit (Graphics Processing Unit, GPU) 741 and a microphone 742. The graphics processing unit 741 processes image data of a static image or a video obtained by an image capturing apparatus (such as, a camera) in a video capturing mode or an image capturing mode. A processed image frame may be displayed on the display unit 76. A image frame processed by the graphics processing unit 741 may be stored in the memory 79 (or another storage medium) or sent by the radio frequency unit 71 or the network module 72. The microphone 742 may receive a sound and can process such sound into audio data. The audio data obtained through processing may be converted, in a telephone call mode, into a format that can be sent to a mobile communications base station via the radio frequency unit 71 for output.

The terminal 70 further includes at least one sensor 75, such as a light sensor, a motion sensor, and another sensor. Specifically, the light sensor includes an ambient light sensor and a proximity sensor, where the ambient light sensor can adjust brightness of the display panel 761 based on brightness of ambient light, and the proximity sensor can turn off the display panel 761 and/or backlight when the terminal 70 moves towards the ear. As a type of the motion sensor, an accelerometer sensor may detect magnitude of an acceleration in each direction (generally three axes), and may detect magnitude and a direction of gravity when being static. The accelerometer sensor may be used for recognizing terminal gesture (for example, horizontal and vertical screen switching, a related game, or magnetometer posture calibration), a function related to vibration recognition (for example, a pedometer or a strike), or the like. The sensor 75 may further include a fingerprint sensor, a pressure sensor, an iris sensor, a molecular sensor, a gyroscope, a barometer, a hygrometer, a thermometer, an infrared sensor, and the like. This is not described herein again.

The display unit 76 is configured to display information entered by a user or information provided for the user. The display unit 76 may include a display panel 761, and the display panel 761 may be configured in a form of liquid crystal display (Liquid Crystal Display, LCD), organic light-emitting diode (Organic Light-Emitting Diode, OLED), or the like.

The user input unit 77 may be configured to receive inputted digit or character information and generate key signal input related to user setting and function control of the terminal. Specifically, the user input unit 77 includes a touch panel 771 and another input device 772. The touch panel 771 is also referred to as a touchscreen, and may collect a touch operation performed by a user on or near the touch panel 771 (such as an operation performed by a user on the touch panel 771 or near the touch panel 771 by using any proper object or accessory, such as a finger or a stylus). The touch panel 771 may include two parts: a touch sensing apparatus and a touch controller. The touch sensing apparatus senses a touch position of the user, senses a signal brought by the touch operation, and transmits the signal to the touch controller. The touch controller receives touch information from the touch sensing apparatus, converts the touch information into contact coordinates, sends the contact coordinates to the processor 710, and receives and executes a command sent by the processor 710. In addition, the touch panel 771 can be implemented in various types such as resistive, capacitive, infrared, and surface acoustic waves. In addition to the touch panel 771, the user input unit 77 may further include the another input device 772. Specifically, the another input device 772 may include but is not limited to one or more of a physical keyboard, a function key (such as a volume control key or an on/off key), a trackball, a mouse, a joystick, and the like. Details are not described herein.

Further, the touch panel 771 may cover the display panel 761. When the touch panel 771 senses touch operations thereon or nearby, the touch panel 771 transmits the touch operations to the processor 710 to determine a type of a touch event. Subsequently, the processor 710 provides corresponding visual output on the display panel 761 according to the type of the touch event. In FIG. 7, the touch panel 771 and the display panel 761 are used as two independent components to implement input and output functions of the terminal. However, in some embodiments, the touch panel 771 and the display panel 761 may be integrated to implement the input and output functions of the terminal. This is not specifically limited herein.

The interface unit 78 is an interface connecting an external apparatus to the terminal 70. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 78 may be configured to receive an input (for example, data information or power) from an external apparatus and transmit the received input to one or more elements in the terminal 70, or transmit data between the terminal 70 and the external apparatus.

The memory 79 may be configured to store a software program and various data. The memory 79 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 79 may include a high-speed random access memory, and may further include a non-volatile memory such as at least one magnetic disk storage component, a flash memory component, or another volatile solid-state storage component.

The processor 710 is a control center of the terminal, and connects all parts of the entire terminal by using various interfaces and lines. By running or executing a software program and/or a module stored in the memory 79 and invoking data stored in the memory 79, the processor 710 performs various functions of the terminal and data processing, to perform overall sensing on the terminal. The processor 710 may include one or more processing units. Optionally, the processor 710 may be integrated with an application processor and a modem processor. The application processor mainly processes the operating system, the user interface, applications, etc. The modem processor mainly processes wireless communication. It may be understood that, alternatively, the modem processor may not be integrated into the processor 710.

The terminal 70 may also include a power supply 711 (for example, a battery) that supplies power to various components. Optionally, the power supply 711 may be logically connected to the processor 710 through a power supply management system, to perform functions of managing charging, discharging, and power consumption through the power supply management system.

In addition, the terminal 70 includes some functional modules not shown. Details are not described herein again.

Figure 8:
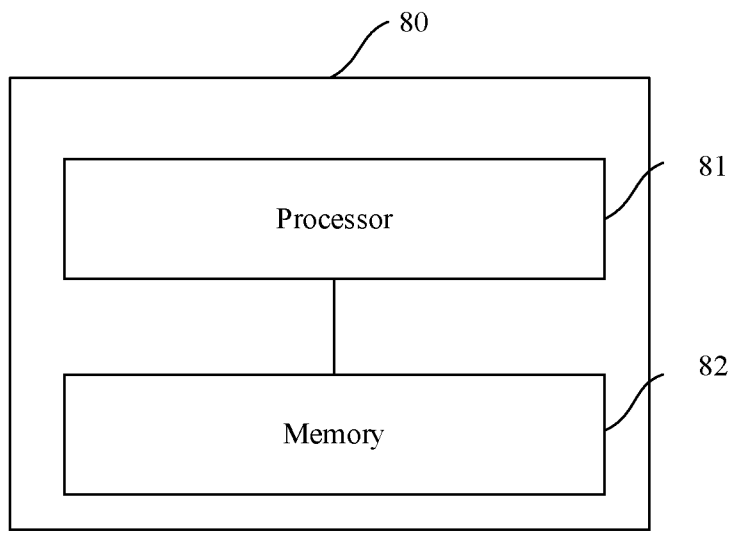
FIG. 8 is a schematic structural diagram of a terminal according to still another embodiment of this disclosure.

Referring to FIG. 8, FIG. 8 is a schematic structural diagram of a terminal according to still another embodiment of this disclosure. The terminal 80 includes: a processor 81 and a memory 82. In the embodiments of the present disclosure, the terminal 80 further includes: a computer program stored in the memory 82 and executable on the processor 81. When the computer program is executed by the processor 81, the following step is performed:

determining a target transmission resource of a to-be-transmitted data packet, where the target transmission resource is selected from one of the following:
a periodically reserved transmission resource obtained according to a sensing result of a first sensing window;
a transmission resource obtained according to a sensing result of a second sensing window, where a start time of the second sensing window is or later than an arrival time of the data packet; and
a randomly selected transmission resource.

The processor 81 is responsible for management of a bus architecture and general processing. The memory 82 may store data used when the processor 81 performs an operation.

Alternatively, when the computer program is executed by the processor 81, the following steps may be further performed: before the determining a target transmission resource of a to-be-transmitted data packet, further including:

sensing a specified transmission resource in the first sensing window, to obtain a sensing result; and
periodically reserving a first quantity of transmission resources according to the sensing result.

Optionally, the first quantity is determined in one of the following manners:
determined by the terminal according to at least one of parameters of a transmission block size, a service type, a quality of service QoS parameter, a subcarrier spacing, a transmission rate, a modulation and coding scheme, and a layer number;
configured by a base station or the terminal;
preconfigured by a base station or a terminal; and
predefined in a protocol.

Alternatively, when the computer program is executed by the processor 81, the following steps may be further performed: the determining a target transmission resource of a to-be-transmitted data packet includes:

determining whether the reserved transmission resource satisfies performance of the data packet; and
if yes, selecting the reserved transmission resource as the target transmission resource.

Optionally, the performance includes: at least one of a delay, a QoS parameter, a transmission block size, a modulation and coding scheme, a layer number, and a transmission rate.

Optionally, the reserved transmission resource satisfying the performance of the data packet satisfies at least one of the following conditions:
a minimum time interval from the data packet is less than a specified threshold; and
greater than a resource required by the data packet.

Alternatively, when the computer program is executed by the processor 81, the following steps may be further performed: after the determining whether the reserved transmission resource satisfies performance of the data packet, further including:

if not, sensing a specified transmission resource in the second sensing window, to obtain a sensing result;
determining whether there is an available transmission resource according to the sensing result; and
if yes, selecting the available transmission resource as the target transmission resource.

Optionally, when the computer program is executed by the processor 81, the following steps may be further performed: after the determining whether there is an available transmission resource in the resource selection window, further including:

if not, randomly selecting a transmission resource as the target transmission resource.

Alternatively, when the computer program is executed by the processor 81, the following steps may be further performed: after the determining whether the reserved transmission resource satisfies performance of the data packet, further including:

if not, randomly selecting a transmission resource as the target transmission resource.

Alternatively, when the computer program is executed by the processor 81, the following steps may be further performed: the determining a target transmission resource of the data packet includes:

sensing a specified transmission resource in the second sensing window, to obtain a sensing result;
determining whether there is an available transmission resource according to the sensing result; and
if yes, selecting the available transmission resource as the target transmission resource.

Optionally, when the computer program is executed by the processor 81, the following steps may be further performed: after the determining whether there is an available transmission resource, further including:

if not, randomly selecting a transmission resource as the target transmission resource.

Optionally, the second sensing window is determined in one of the following manners:
determined by the terminal according to at least one of a delay and a QoS parameter of the data packet;
configured by a base station or the terminal;
preconfigured by a base station or a terminal; and
predefined in a protocol.

Optionally, the available transmission resource includes at least one of the following:
a transmission resource not reserved by the terminal and another terminal;

a transmission resource whose measurement result is less than a preset threshold;

a reserved transmission resource on which a priority of another terminal is lower than a priority of the data packet;

an unoccupied transmission resource of reserved transmission resources on which a priority of another terminal is higher than a priority of the data packet; and an unoccupied transmission resource of reserved transmission resources of another terminal.

Alternatively, when the computer program is executed by the processor 81, the following steps may be further performed: the determining a target transmission resource of the data packet includes:

randomly selecting a transmission resource as the target transmission resource.

Optionally, the sensing result includes: a sensing result of control information and/or a measurement result.

Optionally, the control information includes: at least one of time domain information, frequency domain information, a resource reservation indicator, a resource occupancy indicator, and a priority.

Optionally, the measurement result includes: at least one of an interference measurement result, a radio resource management RRM measurement result, and a channel occupancy measurement result.

Optionally, the periodically reserved transmission resource is in the first resource selection window, and the first resource selection window is determined in one of the following manners:

configured by a base station or the terminal;
preconfigured by a base station or a terminal; and
predefined in a protocol.

Optionally, the transmission resource obtained according to the sensing result of the second sensing window is in the second resource selection window, and the second resource selection window is determined in one of the following manners:

determined by the terminal according to at least one of a delay and a QoS parameter of the data packet;
configured by a base station or the terminal;
preconfigured by a base station or a terminal; and
predefined in a protocol.

Optionally, the randomly selected transmission resource is in the third resource selection window, and the third resource selection window is determined in one of the following manners:

determined by the terminal according to at least one of a delay and a QoS parameter of the data packet;
configured by a base station or the terminal;
preconfigured by a base station or a terminal; and
predefined in a protocol.

Optionally, the transmission resource includes at least one of a time domain resource, a frequency domain resource, a code domain resource, a space domain resource, and power.

Optionally, the target transmission resource is one resource or a plurality of resources; and when the target transmission resource is a plurality of resources, the plurality of resources are a plurality of continuous time domain resources, a plurality of discontinuous time domain resources, a plurality of continuous frequency domain resources, a plurality of discontinuous frequency domain resources, and/or a plurality of candidate patterns.

Optionally, the specified transmission resource is a transmission resource corresponding to the data packet, and the specified transmission resource is determined in one of the following manners:

determined by the terminal according to at least one of a priority, a QoS parameter, a subcarrier spacing, a service type, and a measurement result;
configured by the terminal and the base station;
preconfigured by the terminal and the base station; and
predefined in a protocol.

An embodiment of the present disclosure further provides a computer readable storage medium, storing a computer program, where when the computer program is executed by the processor, the processes of the foregoing embodiments of the resource selection method are implemented, and the same technical effects can be achieved. To avoid repetition, details are not described herein again. The computer readable storage medium may be a read-only memory (Read-Only Memory, ROM), a random access memory (Random Access Memory, RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A resource selection method performed by a terminal, comprising:

determining a target transmission resource of a to-be-transmitted data packet, wherein the target transmission resource is a transmission resource obtained according to a sensing result of a sensing window, wherein determining the target transmission resource of the data packet comprises:
   sensing a specified transmission resource in the sensing window to obtain the sensing result of the sensing window; and
   determining whether there is an available transmission resource according to the sensing result of the sensing window.

2. The resource selection method according to claim 1, wherein a start time of the sensing window is equal to or later than an arrival time of the data packet.

3. The resource selection method according to claim 2, wherein the available transmission resource comprises at least one of the following:
   a transmission resource not reserved by the terminal and another terminal;
   a transmission resource whose measurement result is less than a preset threshold;
   a reserved transmission resource on which a priority of another terminal is lower than a priority of the data packet;
   an unoccupied transmission resource of reserved transmission resources on which a priority of another terminal is higher than a priority of the data packet; or
   an unoccupied transmission resource of reserved transmission resources of another terminal.

4. The resource selection method according to claim 1, wherein determining whether there is an available transmission resource according to the sensing result of the sensing window comprises:
   responsive to determining that there is an available transmission resource, selecting the available transmission resource as the target transmission resource; or
   responsive to determining that there is no available transmission resource, randomly selecting a transmission resource as the target transmission resource.

5. The resource selection method according to claim 1, wherein the sensing window is determined in one of the following manners:
   determined by the terminal according to at least one of a delay and a quality of service (QoS) parameter of the data packet;
   configured by a base station or the terminal;
   preconfigured by the base station or the terminal; and
   predefined in a protocol.

6. The resource selection method according to claim 1, wherein the sensing result comprises: a sensing result of control information or a measurement result.

7. The resource selection method according to claim 6, wherein the control information comprises at least one of: time domain information, frequency domain information, a resource reservation indicator, a resource occupancy indicator, or a priority; or
   wherein the measurement result comprises at least one of: an interference measurement result, a radio resource management (RRM) measurement result, or a channel occupancy measurement result.

8. The resource selection method according to claim 1, wherein the transmission resource obtained according to the sensing result of the sensing window is in a resource selection window, and the resource selection window is determined in one of the following manners:
   determined by the terminal according to at least one of a delay and a quality of service (QoS) parameter of the data packet;
   configured by a base station or the terminal;
   preconfigured by the base station or the terminal; and
   predefined in the protocol.

9. The resource selection method according to claim 1, wherein the specified transmission resource is a transmission resource corresponding to the data packet, and the specified transmission resource is determined in one of the following manners:
   determined by the terminal according to at least one of a priority, a quality of service (QoS) parameter, a subcarrier spacing, a service type, or a measurement result;
   configured by the terminal and a base station;
   preconfigured by the terminal and the base station; and
   predefined in a protocol.

10. A terminal, comprising:
   a processor, a memory, and a computer program that is stored in the memory, wherein the computer program, when executed by the processor, implements a resource selection method comprising:
   determining a target transmission resource of a to-be-transmitted data packet, wherein the target transmission resource is selected from:
   a transmission resource obtained according to a sensing result of a sensing window,
   wherein determining the target transmission resource of the data packet comprises:
      sensing a specified transmission resource in the sensing window to obtain the sensing result of the sensing window; and
      determining whether there is an available transmission resource according to the sensing result of the sensing window.

11. The terminal according to claim 10, wherein a start time of the sensing window is equal to or later than an arrival time of the data packet.

12. The terminal according to claim 10, wherein the available transmission resource comprises at least one of the following:
   a transmission resource not reserved by the terminal and another terminal;
   a transmission resource whose measurement result is less than a preset threshold;
   a reserved transmission resource on which a priority of another terminal is lower than a priority of the data packet;
   an unoccupied transmission resource of reserved transmission resources on which a priority of another terminal is higher than a priority of the data packet; or
   an unoccupied transmission resource of reserved transmission resources of another terminal.

13. The terminal according to claim 10, wherein the sensing result comprises: a sensing result of control information or a measurement result.

14. The terminal according to claim 13, wherein the control information comprises at least one of: time domain information, frequency domain information, a resource reservation indicator, a resource occupancy indicator, or a priority; or
   wherein the measurement result comprises at least one of: an interference measurement result, a radio resource management (RRM) measurement result, or a channel occupancy measurement result.

15. The terminal according to claim 10, wherein the transmission resource obtained according to the sensing result of the sensing window is in a resource selection window, and the resource selection window is determined in one of the following manners:

determined by the terminal according to at least one of a delay and a quality of service (QoS) parameter of the data packet;

configured by a base station or the terminal;

preconfigured by the base station or the terminal; and predefined in the protocol.

16. The terminal according to claim 10, wherein the specified transmission resource is a transmission resource corresponding to the data packet, and the specified transmission resource is determined in one of the following manners:

determined by the terminal according to at least one of a priority, a quality of service (QoS) parameter, a subcarrier spacing, a service type, or a measurement result;

configured by the terminal and a base station;

preconfigured by the terminal and the base station; and predefined in a protocol.

17. A non-transitory computer readable storage medium, wherein the computer readable storage medium stores a computer program, and the computer program, when executed by a processor, implements a resource selection method comprising:

determining a target transmission resource of a to-be-transmitted data packet, wherein the target transmission resource is selected from a transmission resource obtained according to a sensing result of a sensing window, wherein determining the target transmission resource of the data packet comprises:

sensing a specified transmission resource in the sensing window to obtain the sensing result of the sensing window; and determining whether there is an available transmission resource according to the sensing result of the sensing window.

18. The terminal according to claim 10, wherein determining whether there is an available transmission resource according to the sensing result of the sensing window comprises:

responsive to determining that there is an available transmission resource, selecting the available transmission resource as the target transmission resource; or responsive to determining that there is no available transmission resource, randomly selecting a transmission resource as the target transmission resource.

19. The terminal according to claim 10, wherein the sensing window is determined in one of the following manners:

determined by the terminal according to at least one of a delay and a quality of service (QoS) parameter of the data packet;

configured by a base station or the terminal;

preconfigured by the base station or the terminal; and predefined in a protocol.

20. The non-transitory computer readable storage medium according to claim 17, wherein a start time of the sensing window is equal to or later than an arrival time of the data packet.

* * * * *